(12) United States Patent
Singh et al.

(10) Patent No.: US 7,243,907 B2
(45) Date of Patent: Jul. 17, 2007

(54) VEHICLE-MOUNTED HYDRO-ELECTRIC JACK SYSTEM

(76) Inventors: Gurbakhash Singh, House No 1224, Ward No 5, Ajit Nagar, Moga, Punjab (IN) 142001; Sunil K. Ahuja, 27 Rio Vista Dr., Alpine, NJ (US) 07620

( * ) Notice: Subject to any disclaimer, the term of this patent is extended or adjusted under 35 U.S.C. 154(b) by 0 days.

(21) Appl. No.: 10/926,960

(22) Filed: Aug. 27, 2004

(65) Prior Publication Data
US 2006/0043352 A1    Mar. 2, 2006

(51) Int. Cl.
*B60S 9/02*    (2006.01)
(52) U.S. Cl. .................................... 254/423
(58) Field of Classification Search ........ 254/418–425, 254/89 H, 93 VA
See application file for complete search history.

(56) References Cited

U.S. PATENT DOCUMENTS

| | | | | |
|---|---|---|---|---|
| 4,993,688 A | * | 2/1991 | Mueller et al. | ............. 254/423 |
| 5,188,379 A | * | 2/1993 | Krause et al. | ............. 254/423 |
| 5,224,688 A | * | 7/1993 | Torres et al. | ............. 254/423 |
| 5,636,830 A | * | 6/1997 | Chartrand | ............. 254/423 |
| 5,722,641 A | * | 3/1998 | Martin et al. | ............. 254/423 |
| 2005/0045859 A1 | * | 3/2005 | Williams | ............. 254/89 H |

* cited by examiner

*Primary Examiner*—Lee D. Wilson

(57) ABSTRACT

A hydroelectric jack system, which is mounted on the underside of the vehicle. It comprises of two conventional double direction hydraulic jacks. The jack has a round flat plate which rests on the ground when jack is operated to lift the vehicle. It can be remotely operated using push button controls installed in the dashboard of the vehicle. It utilizes the existing hydraulic cylinder provided currently in the vehicle for their operation(s) e.g. the hydraulic systems to operate steering unit or any other devices. The jack system has safety checks—the electrical circuit of the hydroelectric jack does not operate till the emergency brake is applied. An auto lock system ensures the jack will not open accidentally. In case of a car, jack can be installed on to the floor beam inside the body. Jack is firmly placed in the specially designed hole of required diameter. Jack on both driver's and adjoining seat duly balances the weight of the car. The jack when fitted on to the floor beam works efficiently and without any hindrance to normal vehicle operation. It takes less time to raise the vehicle and to lower it after the work is accomplished. It is very safe and easy to use.

2 Claims, 8 Drawing Sheets

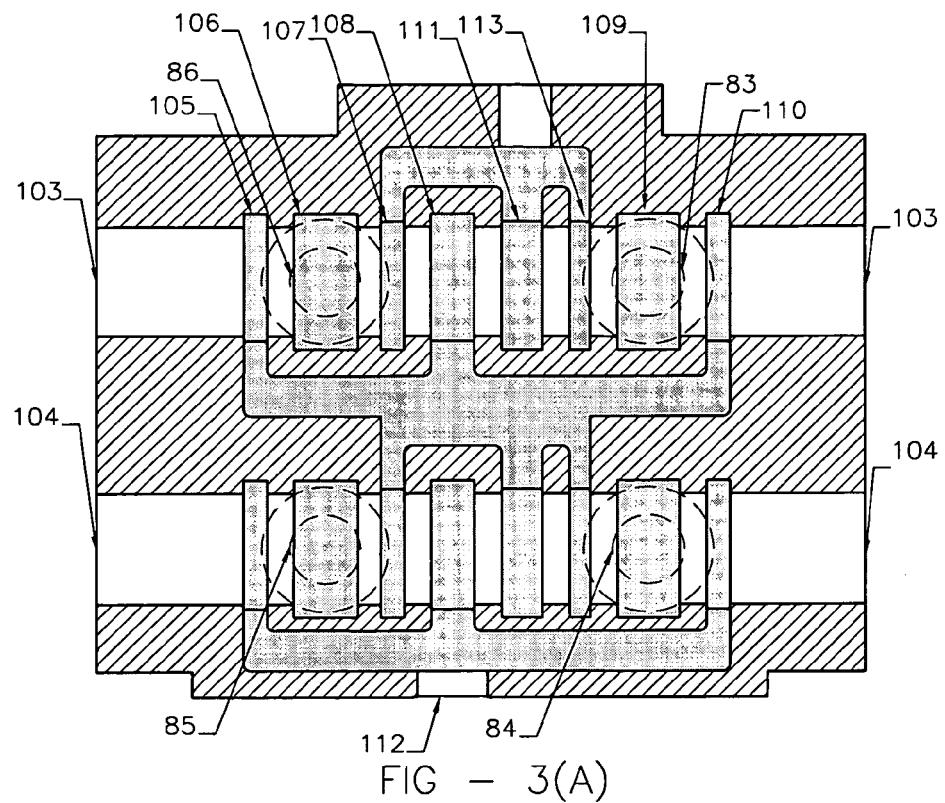
FIG — 3(A)
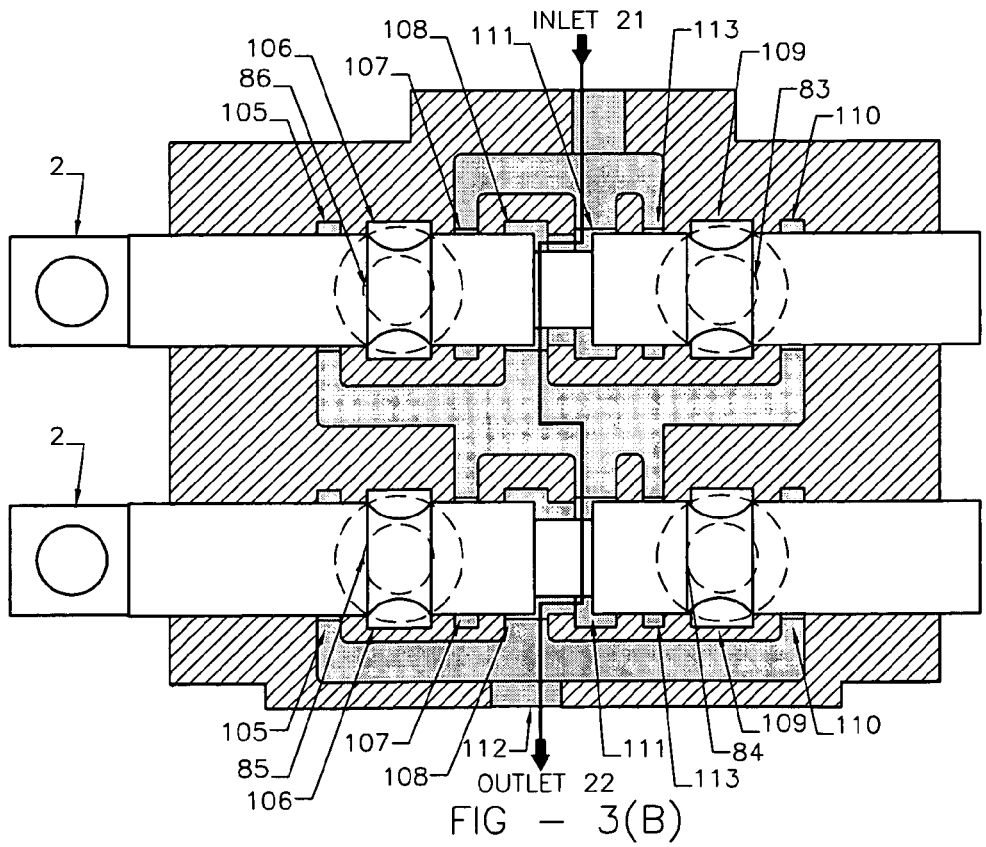
FIG — 3(B)

US 7,243,907 B2

VEHICLE-MOUNTED HYDRO-ELECTRIC JACK SYSTEM

FIELD OF INVENTION

This invention relates to a vehicle mounted hydroelectric jack system for lifting a vehicle on the road to change tires and/or perform repairs. More particularly, the invention relates to a vehicle mounted hydro-electric jack system which can be operated from inside the vehicle, without actually coming out of the vehicle, to perform mechanical operations unlike previous hydro jack system(s).

BACKGROUND

Presently, there are a number of different types of jacks being used to lift a vehicle.

A mechanical type of jack comprises of a power screw rotatably mounted in a housing, screw being fixed to a worm gear at one end, which is meshed with another screw coupled to a handle. A nut is screwed on to the power screw. A load support plate is integral with the nut. When handle is turned, it rotates the screw meshed with worm gear, thereby, rotating the worm gear. The worm gear, in turn, rotates the power screw, which is pivoted at two ends inside the housing. The nut screwed on the power screw moves vertically upward or downward, the load support plate integral with the nut moves with it. The support plate is positioned under the floor beam of the car to lift the car.

A manually operated hydraulic frame type jack system known to the industry comprised of a base, a pressure release valve, a lever, a hydraulic oil cylinder, a piston, a pair of pulling bars, a pair of links, a pair of pushing bars, a load-engaging head and a locking rod. The locking rod is inserted into and extended through the holes on the pushing bars to prevent unintentional lowering of the car jack and the car.

However, to date no hydraulic or hydroelectric jack system is known which can be mounted on the underside of the vehicle and can be operated remotely from the dashboard of a vehicle.

One of the drawbacks of the widely used manual jacks is that the jack has to be physically positioned, by hand, under the vehicle and the handle/lever is operated manually to lift the jack, thereby, lifting the vehicle. Other drawback of the presently used jacks is that it takes a long time, up to 15 to 30 minutes, to lift the vehicle and another 15–20 minutes to bring jack to original position, unbundled and finally store it.

Yet another drawback of the known jacks is that in inclement weather conditions like rain, scorching heat, muddy road conditions or in snow operating a jack causes discomfort to the operator.

The present invention could be comfortably fitted beneath the driver and the adjoining seat. It is provided with the mechanical lock system.

OBJECTS OF THE INVENTION

The objects and benefits of this invention are to propose a hydroelectric jack system which is mounted on the underside of the vehicle that:
1. Can be remotely operated with comfort from inside the vehicle using push button controls installed in the dashboard of the vehicle.
2. Does not need any manual efforts to operate it.
3. Will take less time, both, to lift the vehicle and also to bring the vehicle down, after the work is accomplished.
4. Will be very safe to use and handle.
5. Will be able to utilize the existing hydraulic cylinder provided currently in the vehicle for their operation(s).

Additional objects and advantages of this invention will be more apparent from the ensuing description when read in conjunction with the accompanying drawings.

DESCRIPTION OF ACCOMPANYING DRAWINGS

FIG. 3A to 3D show the functioning of the control valve unit.

DETAILED DESCRIPTION OF THE DRAWING

The ensuing description only illustrates a particular form of this invention. However, such a particular form is only an example of how this invention can be utilized and not intended to be the only form of this invention. This hydraulic jack system may be used with or without additional design modifications in the other applications and uses. The invention is to encompass all such uses and applications even though not described or enumerated here.

Figure 1:
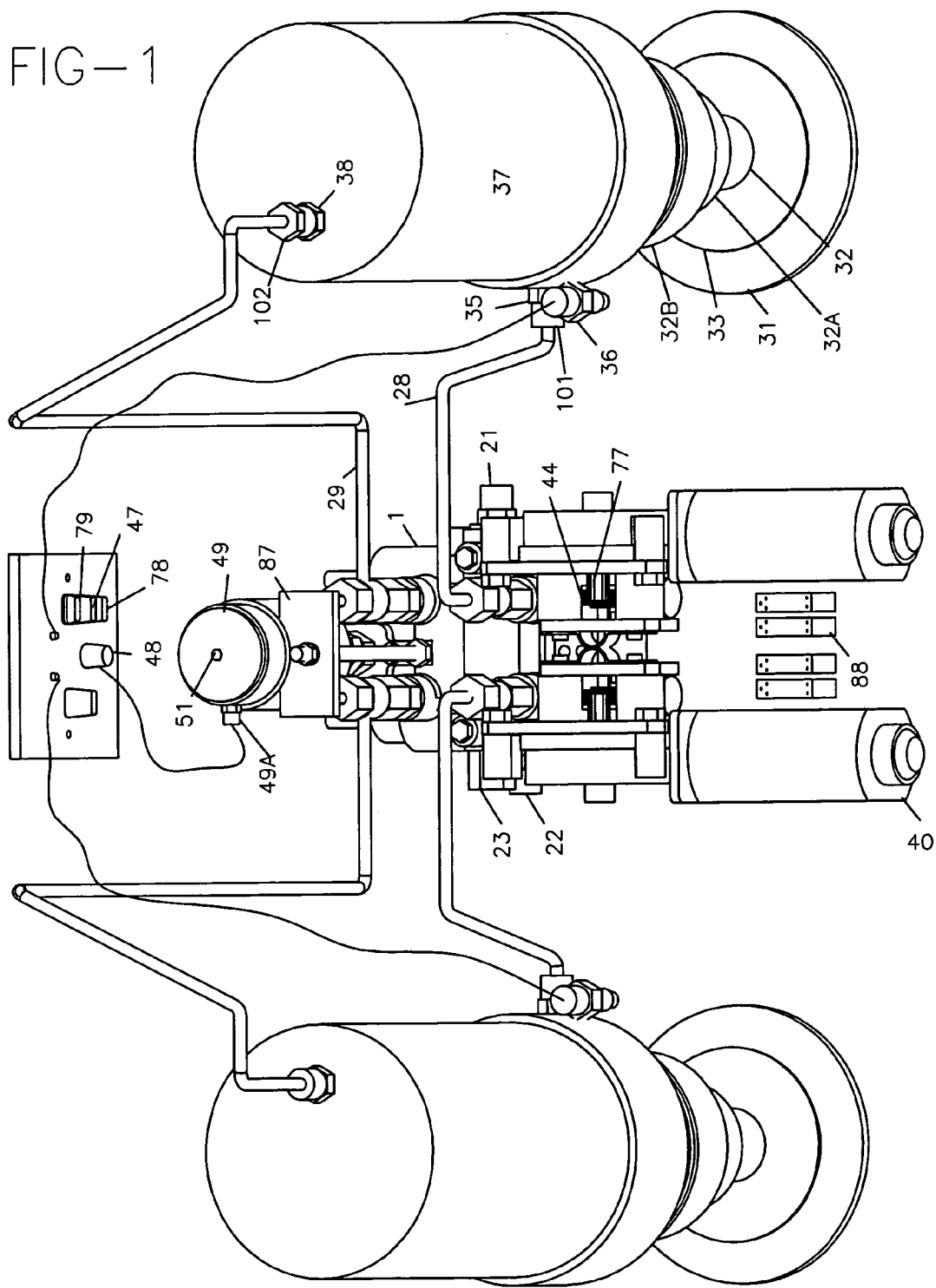
FIG. 1 shows the schematic view of an embodiment of the proposed system.
Figure 2:
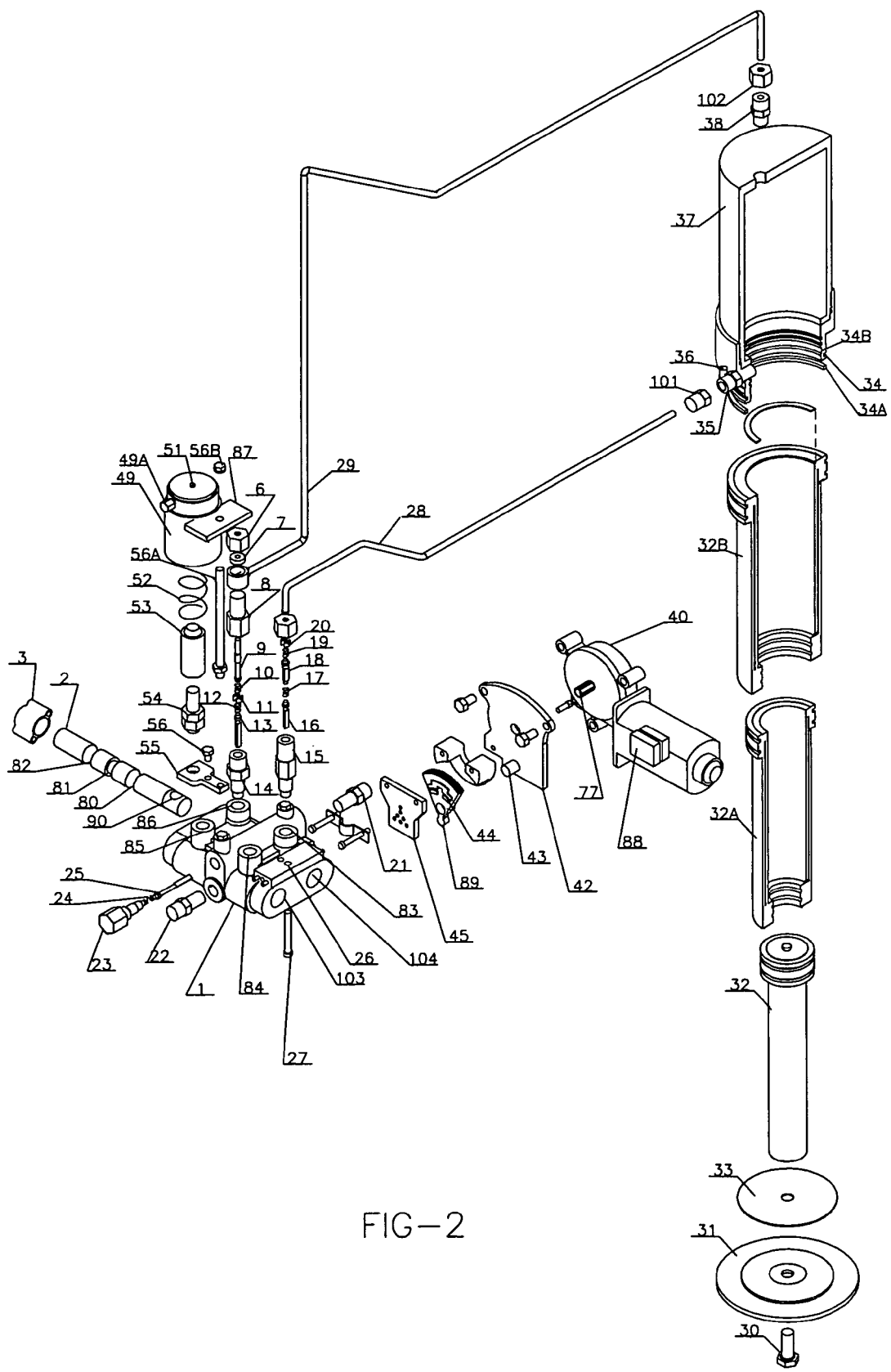
FIGS. 2, 2A, 2B and 2C shows the knocked-down view of the embodiment of the proposed system.
Figure 2A:
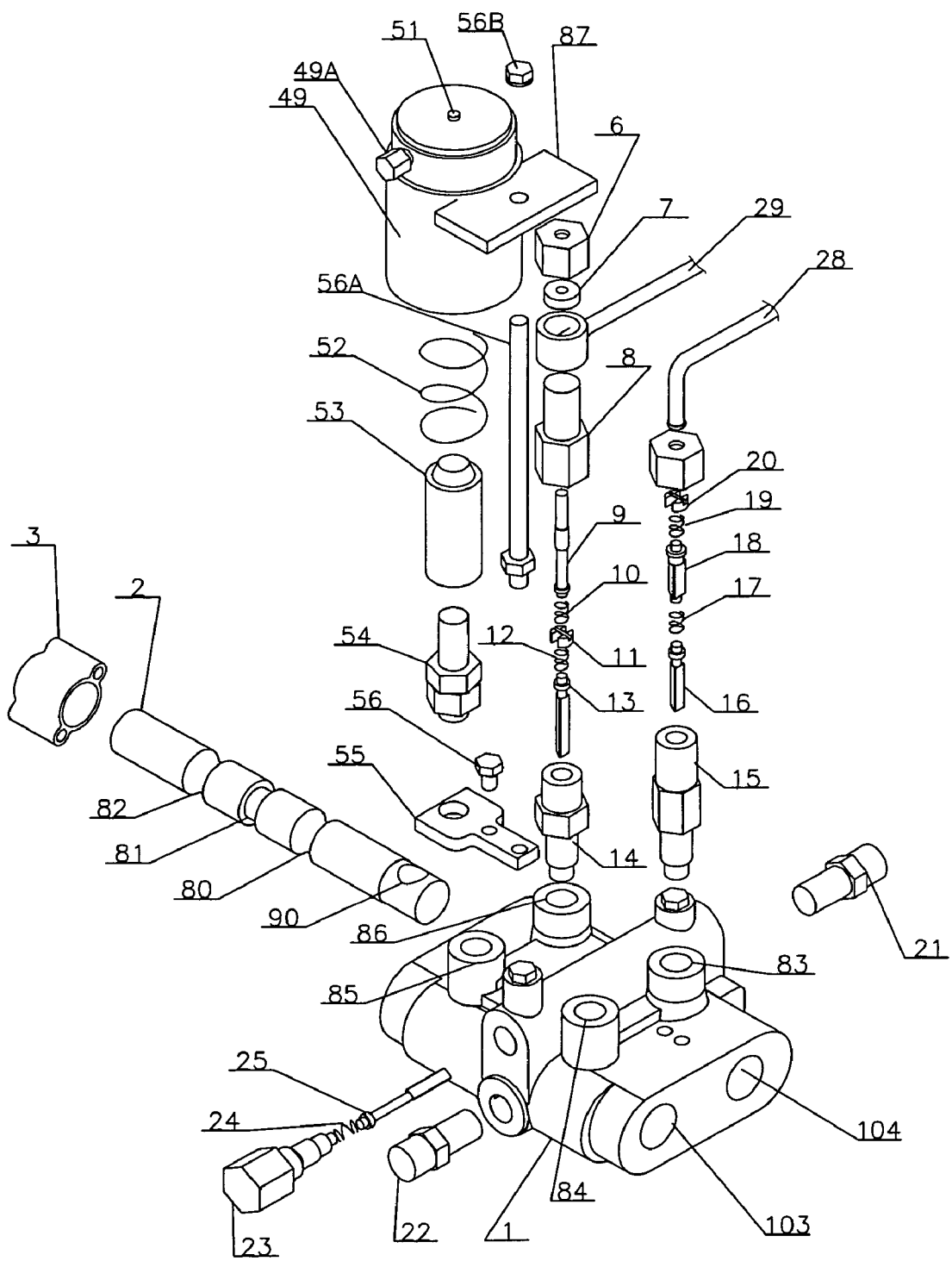
Figure 2B:
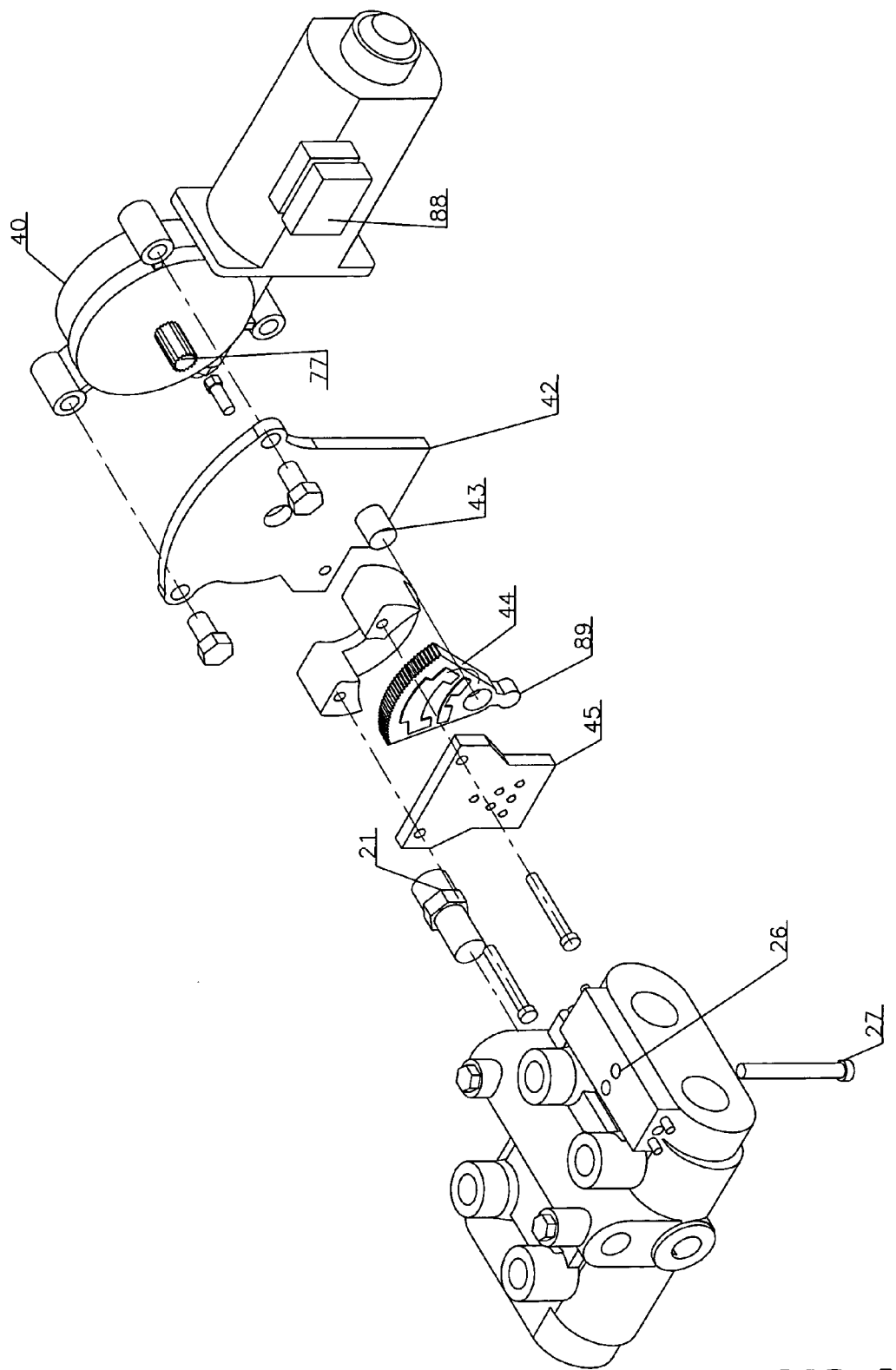
Figure 2C:
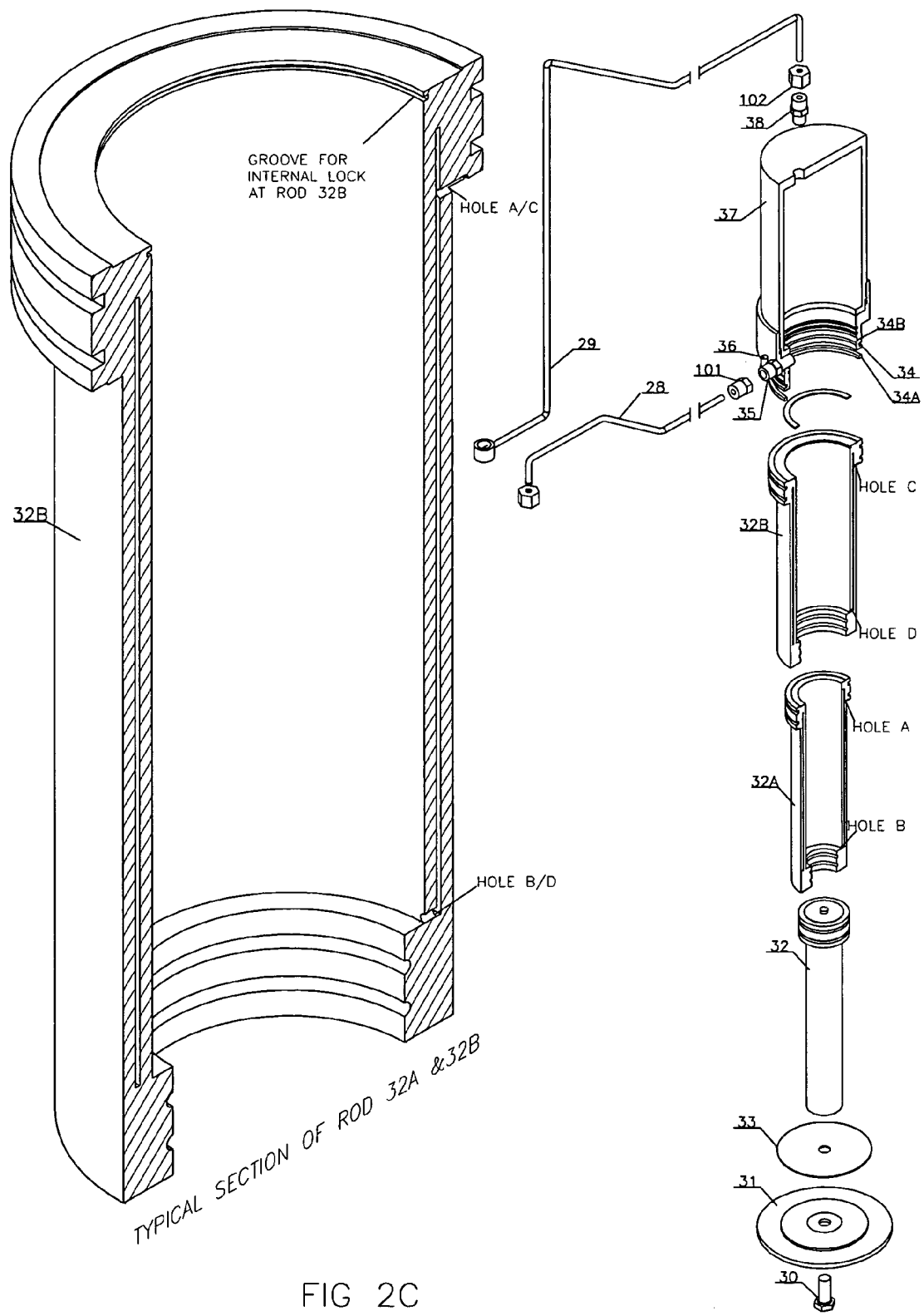
Figure 3C:
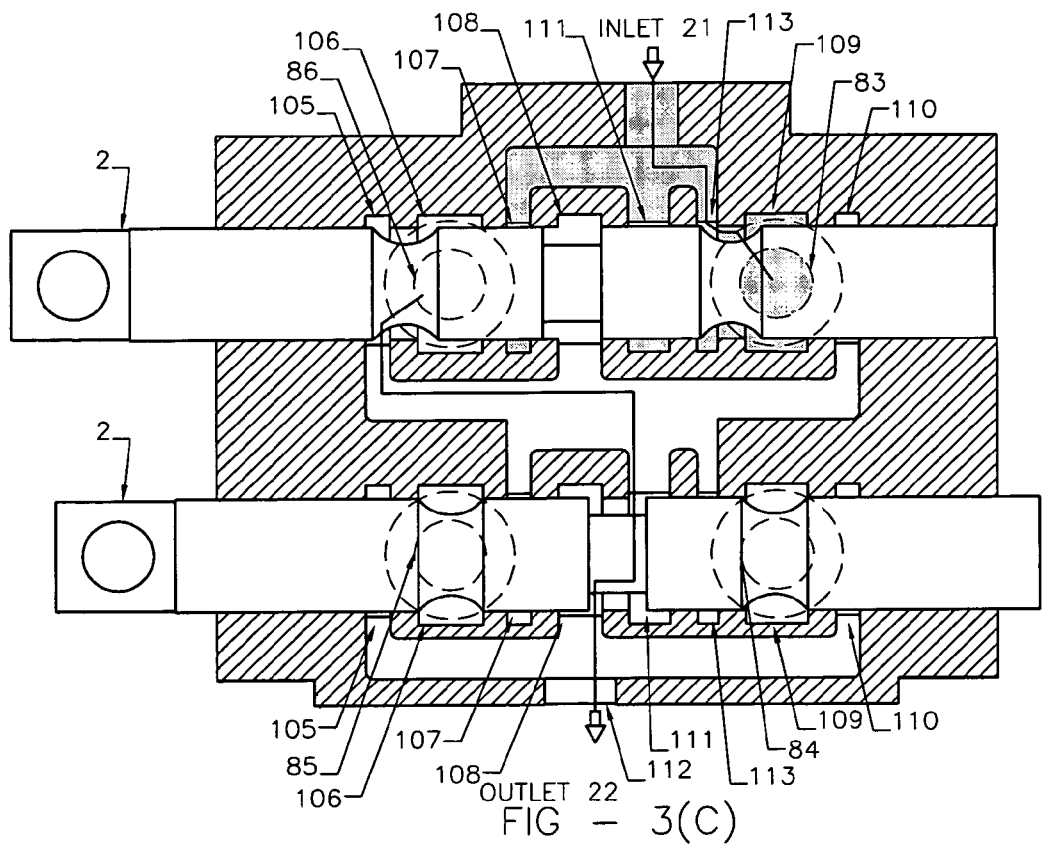
Figure 3D:
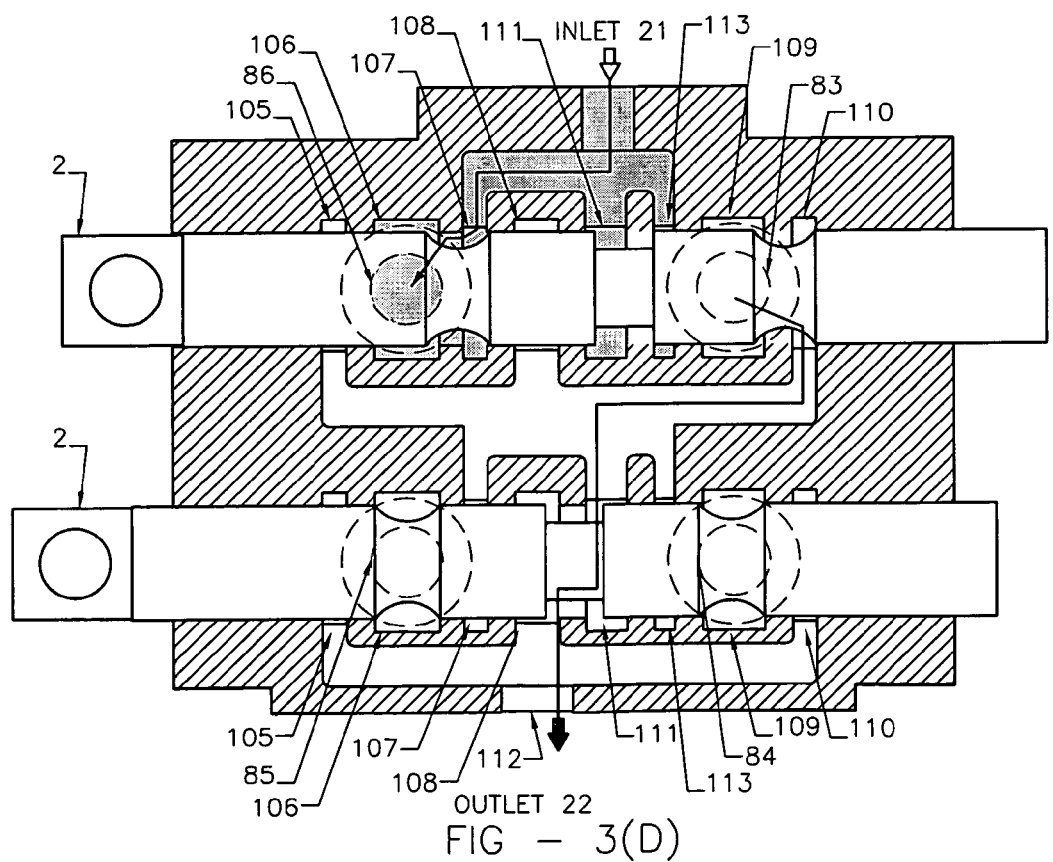
Figure 4:
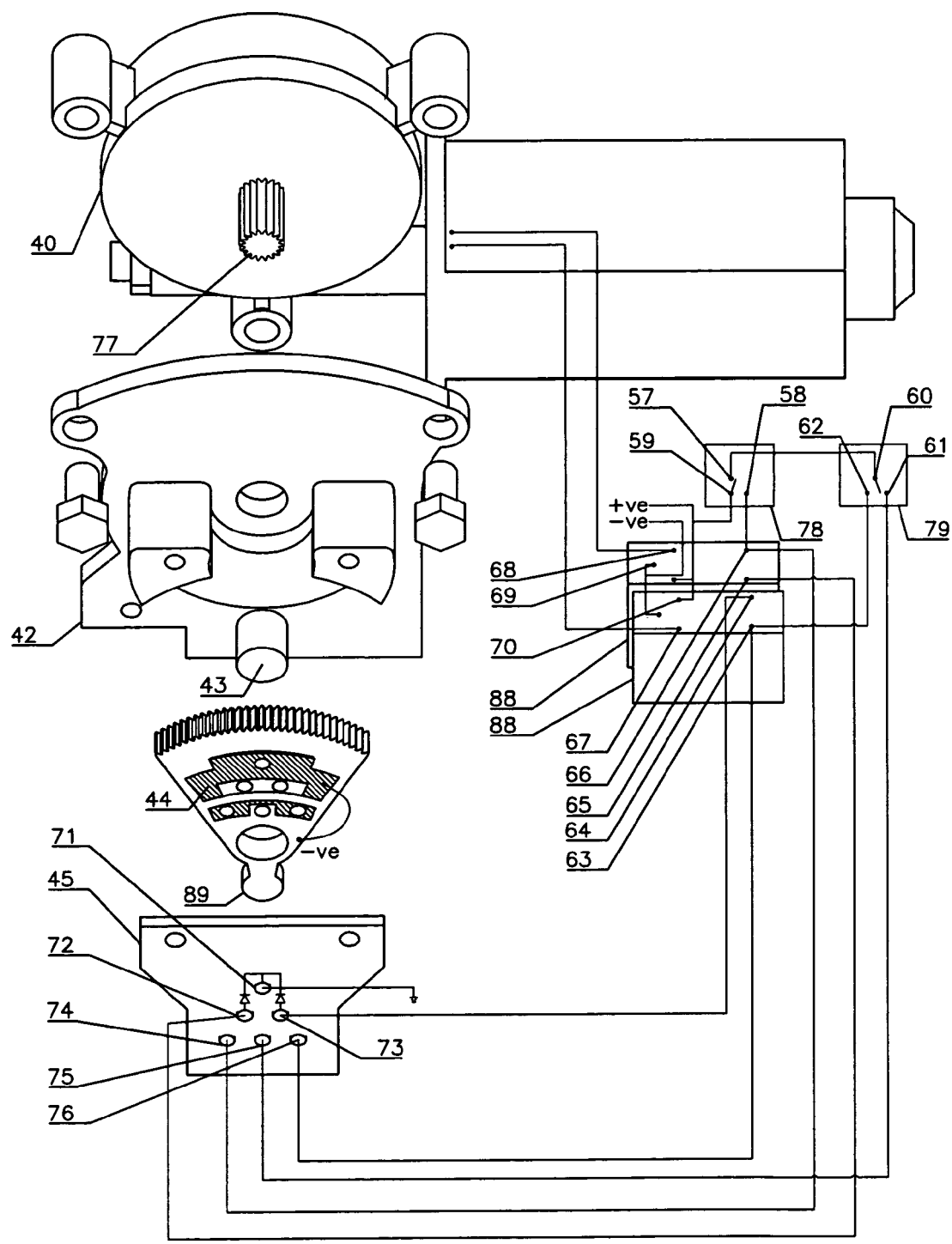
FIG. 4 shows the circuit of electrical actuation and control system.

Referring to FIGS. 1 and 2, the vehicle-mounted hydro-electric jack system comprises of two conventional double direction hydraulic jacks, comprising a cylinder (37) in which jack rod (32) with a piston is slidably fitted, the main jack rod (32) has another inside sub-rod (32A) which moves inside the cylinder (37) when the jack is in operation, sub-rod (32A) has double pipes inside and outside. Slidable sub rod (32B) is also fitted. Inside pipe has under-cut and the outside pipe is closed from both sides. The sub-rod (32A) fitted outside the piston has a hole (A) and the inside pipe has hole (B) from the opposite side. The hydraulic fluid supply to main jack rod (32) for its reverse action. It continuously helps the functions of the main rod with the sub-rod. The jack has a round flat plate (31), fixed to the said jack rod with a bolt (30), which rests on the ground when jack is operated to lift the vehicle. The cylinder has an adapter (35) at one end which a nipple (101) for entry/exhaust of hydraulic fluid.

An electrical switch (36) connected to an indicator light in the dash board, which will indicate whether the jack rod (32), acts as an auto lock system (33) preventing jack to accidentally open on its own. It also auto locks the jack once it folds back in off position after successful operation. The auto lock system (33) when it folds, locks itself in the groove (34B) and, acts as a safety device. For renewed operation, if needed, could be accomplished only when reverse pressure is made available.

Another adapter (38) having a nipple (102) is provided for entry/exhaust of hydraulic fluid in the cylinder on the other side of piston. The cylinder has a plate (39) with a hole at one end to facilitate fixing of the hydraulic jack in the body. The nipples of adapters (35,38) are connected through flexible tee pipes (29) and (28), to control valve unit which is adapted to control inflow or outflow of the hydraulic fluid through the said pipes (28,29). When jack rod is moving up, the inflow of hydraulic fluid takes place through pipe (29) and outflow takes place through pipe (28). The fluid flows in reverse direction through these pipes when jack rod moves inward in the said cylinder (37).

In case of a car, jack can be installed with the floor beam inside the body. Floor beam is a channel on a vehicle (car) which is usually situated beneath the driver and the adjoining seat in the specially designed hole of required diameter in which jack is firmly placed. Jack on both driver and adjoining seat duly balances the weight of the car. The jack has a groove (34) that fits into the slot under the floor of the car. The external lock (34A) fits into the groove (34). The jack when fitted with the floor beam works efficiently and without any hindrance.

Referring to FIG. 3A to 3D, the control valve unit is capable of controlling the operation of two hydroelectric jacks. The control valve unit comprises of a valve body (1) having two identical longitudinal holes (103,104) equidistant from its longitudinal axis. A push rod plunger (2) is slidably fitted in each of these said holes. These said holes selectively align with the grooves (80, 81, 82) of push rod plunger (2) depending upon whether the plunger is in normal position or drawn out or pushed in. The body has inlet port (111) fitted with a adapter nipple (21) and an outlet port fitted with an adapter nipple (22). The said inlet port (111) is connected to groove (112) in neutral condition, supply of oil is through the outlet port (112) and through pipes (105, 106) successively. During reverse movement of the jack rod, the inlet port (111) gets connected to (106, 107) and at the same time (109, 110) connected to (112) successfully. The valve body has four holes (83 to 86) in which the valve assemblies to actuate hydraulic fluid supply/release from the cylinder to operate the jack and fittings. A release valve comprising of a valve (25), a spring (24) and a bolt (23) is provided on the control valve body.

The jack system is provided with an electrical actuation and control system to build in the safety and functionability. The hydroelectric jack system can preferably be used in vehicles that are fitted with hydraulic systems to operate steering unit or any other devices. Hydraulic fluid under pressure enters the jack system through adapter (21), the outlet nipple (22) is connected to the device to be operated e.g. steering unit. The jack system has a number of safety arrangements. The electrical circuit of the hydroelectric jack does not operate till the hand brake is applied whereby the hand brake indicator wire works as a 'main' switch for the jack system. The system is provided with a coil (49) to which a plate (87) is bolted. The said flat plate is in turn fixed to the valve body with a bolt (56). The coil is electrically connected to the power supply (battery) of the vehicle through a dashboard-mounted push button. A two-way push button (47) is provided for controlling the rotation of motor A motor (40) with worm gear is fitted with a gear (41) having an integral pinion (77). The pinion (77) meshes with a gear sector (44). The gear sector (44) is made of non-metallic material selected from Bakelite or fibre glass laminate on which conducting material copper sheet is fixed, which is arranged to make and break circuit between pins (71 to 76) provided on plate (45), depending upon the angular position of the gear sector. The said are connected through a plurality of relays (88) to motor terminals (67, 68) to switch the polarity of the terminals depending upon position of gear sector and the polarity is switched when either side of two ways push button (47) is pressed. The said gear sector (44) is rotably mounted on a center pin (43) on mounted plate (42). The gear sector has a lug (89) which engages with a groove (90) in one end of said push rod plunger (2). The motor mounting plate (42) is fixed to the foundation (26) with a bolt (27).

To operate the hydroelectric jack, the vehicle is stopped and the hand brake of the vehicle is applied. This switches-on the electrical circuit of the hydroelectric jack. A push button (48) which has positive charge, provided by the vehicle battery, forwards the positive current to the externally linked bolt (49A) when pressed-on by the switch provided on dash board. By this way, the electromagnetic field energizes the coil (49). The coil becomes magnetic and moves towards the piston (53) thereby moving the plate (87) which in turn presses valve (9). The two-way push button (47) is pressed on pre-determined side (78).

The motor (40) rotates the gear sector (44). The lug (89) engaging in groove (90) pulls the push rod plunger (2) out. The groove (82) pushes up and opens the valve (13). Hydraulic fluid from inlet part (111) flows under pressure via groove (107) to groove (106) then to jack. From the jack, hydraulic fluid flows to outlet port (112) thereby pushing out the piston and rod (32) to extend the jack. Simultaneously groove (80) lifts the valve (16, 18) to allow the release of hydraulic fluid pipe (28) into the valve body from which it goes out through groove (80) via groove (109) to outlet port (112).

(16), (18), (9) functions as safety valves to prevent the hydraulic jack movement from its original position while the vehicle is running.

When the jack is fully extended, the indicator light passes the indication to the dashboard. The push button (47) is released. The release of push button (47) and position of gear sector on pins (71, 76) results in reversal of polarity of power supply to motor. The motor moves in the opposite direction and stops when plunger again comes in normal position. In this position motor gets supply from only negative terminal. The valve is no longer pressed and is in closed position. The hydraulic fluid flows directly from inlet to outlet. The jack is in extended position with hydraulic fluid locked in the cylinder.

When the push rod plunger (2) is in operation, it automatically gives movement to the safety valve fitted on the groove of the push rod plunger (2). The hydraulic fluid is blocked on both sides of the hydraulic cylinder.

To release the jack, the push button (47) is pressed on the other side (79). The motor (40) rotate, along with which the gear sector (44) rotates and the lug (89) engaging in groove (90) pushes in the pushrod plunger (2). The groove (82) comes in alignment with groove (109) with valves (9) and (13) open, the hydraulic fluid flows through pipe (29) from where it goes out through outlet port (22). The hydroelectric jack starts retracting. When fully retracted, the push button is released. This reverses the connection for motor which rotates in opposite direction. The gear segment rotates along with it. The lug of gear segment in groove of push rod plunger (2) pulls the plunger out to its normal position. The description given for one hydraulic jack also holds good for other jack which is operated with a similar two way switch provided thereof.

Pin plate (45) is in the fixed position in the electric circuit gear (44), beneath pin plate, guides the direction by itself moving in the direction dictated by the motor (40), thereby gives cut off or cut on.

The lug part (89) of the circuit gear (44) is connected to push rod plunger (2). In the neutral position of the electric circuit there are provided two relays in which at all times negative current flows in the motor connections (40).

In the switchboard there are two switches. Switch (78) has points (57), (58), (59) while switch (79) has points (60), (61), (62).

When switch (78) is pressed-on and held pressed, positive current is obtained to point (58) from point (59) while the former is linked to point (63). Relay point (64) derives negative current from circuit gear making the relay start moving. By this way, (+67) in conjunction with point (70) provides positive current to motor to make it start. Gear circuit (44) moves in the direction dictated by the motor. Once the motor starts it moves in the stated direction. The pin number (64), which is attached with the relay point (73), obstructs the negative current being provided to relay, making the relay turn-off. Motor comes in the neutral position. Negative current starts flowing in the motor points (67), (68). Once we lift the finger from the earlier pressed-on switch, the point (57) which is already firmly connected with point (60), the positive current flows point (61) to point (75). By the circuit, point (75) gets connected with point (74) making point (65) on the relay positive. Negative supply comes to point (66) and the other relay turns-on and positive current is available to point (68) of the motor.

Motor with the aid of gear circuit comes in the neutral position. Gear circuit obstructs the connection between the points (74) and (75) which turns-off the relay.

When switch (79) is pressed-on, the positive current starts flowing in the points (60) and (62). These two points are further connected to point (65) on the relay and positive current comes in point (65). Point (60) gets negative current from the gear circuit making the relay turn-on. Point (68) in conjunction with point (70) provides positive current to motor making the later move in another direction.

Point (72) which is connected to gear circuit obstructs the negative current making the relay turn-off.

In the points (67) and (68) there starts flowing negative current.

When we raise the finger from pressed-on switch then the current flows from point (61) to point (75). Point (75) is connected to point (76). Point (76) is then connected to relay point (63) which is giving positive current to point (63). By this way, positive supply is given to motor and point (67) which brings the motor to the neutral position.

It is to be understood that the vehicle mounted hydraulic jack of the present invention can be modified, adapted, or changed by engineers and skilled persons for other applications. Such variant applications and uses are intended to be within the scope of the present invention which is further set forth under the claims that follow.

We claim:

1. A vehicle-mounted hydro-electric jack system comprising of:
  a) two conventional double direction hydraulic jack comprising a cylinder (37) in which a jack rod (32) provided with a piston at one end, is slidably fitted, a plate (31) fixed to the one end of said jack rod, a plate (39) provided at one end of the cylinder (37) to fix the said jack under the body of vehicle, plurality of adaptors (35, 38) and pipes (28,29) for connecting the said jack to a control valve unit herein described;
  b) a control valve hydraulically connected to said hydraulic jacks and comprising a valve body (1), two push rod plungers (2) slidably fitted in two identical longitudinal holes (103,104) equidistant from the central line of the said valve body, the said valve body having inlet port (21) outlet port (22), the said holes having identical internal grooves (105–113), the said plungers having identical external grooves (80,81,82), the said grooves being adapted so as to cause extension of said hydraulic jack when said plunger is pulled out and cause retraction of said hydraulic jack when said plunger is pushed in;
  c) safety means comprising a push button (48), a coil unit (49) herein described and a valve (9), the said means being operative only when hand brake is applied;
  d) an electrical actuation and control means comprising two way push button (47) electrically connected to a motor (40) fitted with worm gear (41), the said worm gear having an integral pinion (77) which drives a gear sector (44), the said gear sector being made of non metallic materials selected from Bakelite or fibre glass laminate on which copper sheet is affixed, the said gear sector provided to selectively make or break electrical circuit between pins (71 to 76) provided on plate (45), the said gear mounted on a center pin (43) fixed on a lug (89) which engages with a groove (90) in one end of said push rod plunger, the said pins being electrically connected to plurality of relays that are electrically connected to the terminals of said motor (40);
  e) a coil unit comprising a coil (49) to which a plate (87) is bolted, the coil being fitted with a spring (52) which is slidably mounted over a piston (53), the said piston having a bolt means (54) at one end which is fixed to a flat plate (55), the flat plate being fixed to the said valve body with a bolt means (56).

2. A vehicle-mounted hydro-electric jack system as claimed in claim 1 wherein the said push button (48) and said two way push button (47) are provided on a dash board of vehicle.

* * * * *